(12) United States Patent
Johnson

(10) Patent No.: US 9,561,701 B2
(45) Date of Patent: Feb. 7, 2017

(54) ACTIVE ELECTROMECHANICAL SUSPENSION AND POWER GENERATION SYSTEM USING AN ACCELERATION CONTROLLER

(71) Applicant: Jonathan David Johnson, Seaside, CA (US)

(72) Inventor: Jonathan David Johnson, Seaside, CA (US)

(73) Assignee: Jonathan Johnson, Malina, CA (US)

( * ) Notice: Subject to any disclaimer, the term of this patent is extended or adjusted under 35 U.S.C. 154(b) by 0 days.

(21) Appl. No.: 14/753,016

(22) Filed: Jun. 29, 2015

(65) Prior Publication Data

US 2016/0375739 A1    Dec. 29, 2016

(51) Int. Cl.
*B60G 17/02* (2006.01)
*B60G 17/016* (2006.01)

(52) U.S. Cl.
CPC .......... *B60G 17/0164* (2013.01); *B60G 17/02* (2013.01)

(58) Field of Classification Search
CPC ........................................................ B60K 1/04
See application file for complete search history.

(56) References Cited

U.S. PATENT DOCUMENTS 8,807,258 B2 *   8/2014   Stansbury, III ........ B60K 25/10
                                                           180/165

* cited by examiner

*Primary Examiner* — John Walters
*Assistant Examiner* — James Triggs

(57) ABSTRACT

The invention disclosed herein consists of an active electromechanical suspension and power generation system using an accelerometer connected to a controller. The electromechanical suspension consists of a geared motor and spring, which are used to isolate the vehicle chassis from the wheel, with the motor also functioning as a generator. The controller uses a 3-axis accelerometer's data to determine which direction to turn the motor and when to turn it.

1 Claim, 4 Drawing Sheets

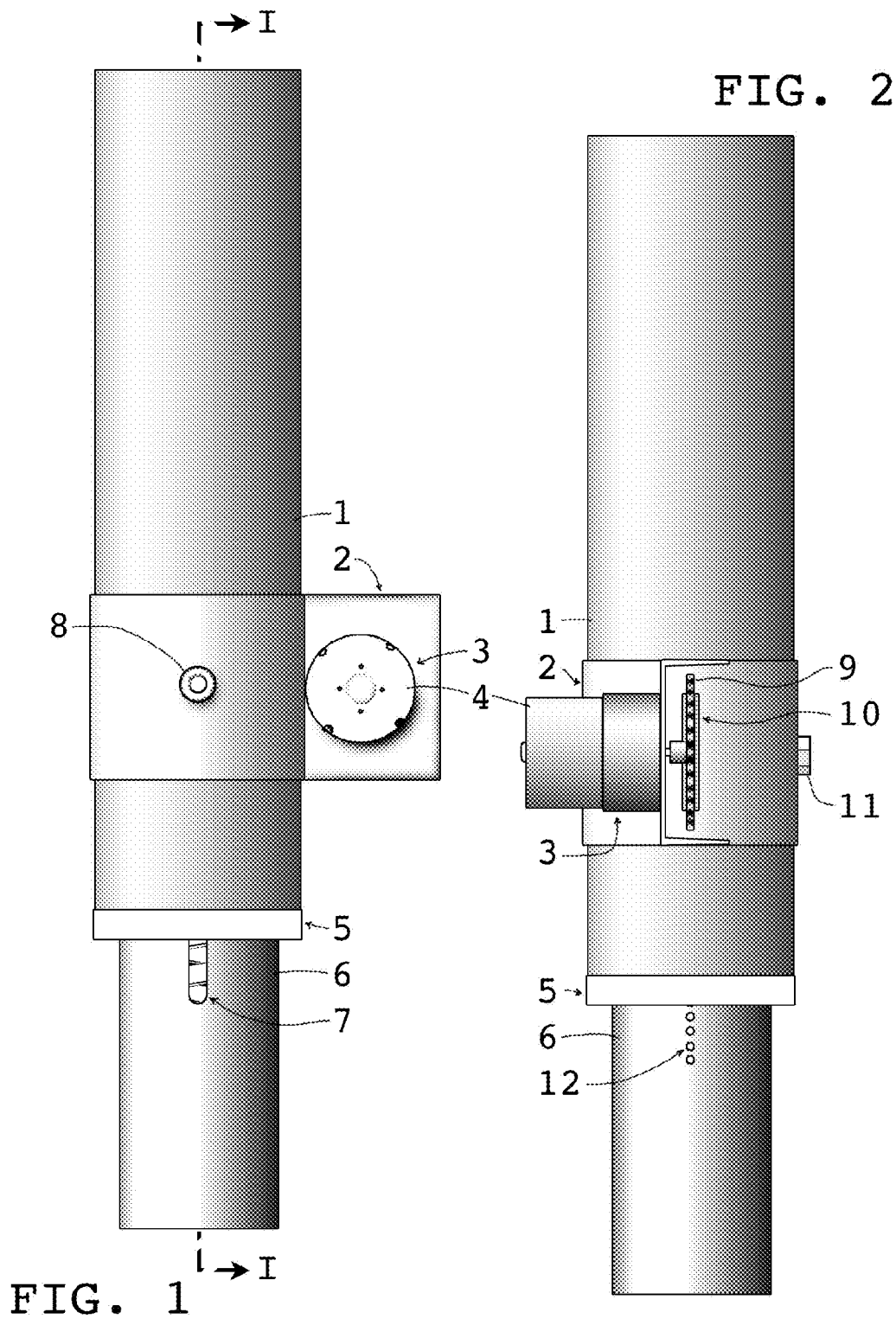

ACTIVE ELECTROMECHANICAL SUSPENSION AND POWER GENERATION SYSTEM USING AN ACCELERATION CONTROLLER

BACKGROUND OF THE INVENTION

Electronics are often used to increase the speed and decrease the weight of modern vehicles. However, the modern vehicle suspension has not taken advantage of this trend to any significant degree. In the past, various electronic systems have been introduced to aid in the function of a suspension, but they often added weight and used valuable space. The engineers seemingly molding their design to produce comfort for luxury vehicles instead of increasing vehicle performance. Although many drivers continue to transition to Electric Vehicles, the use of outdated suspension designs have held back the efficiency potential of these vehicles. This would suggest a need to redesign the basic parts of a suspension by function.

The basic function of a suspension is to reduce the amount of vibration while maintaining vehicle performance, which usually translates to a spring and shock absorber setup. The spring takes the initial shock of various road conditions and stores it as Elastic potential energy, then the shock absorber takes this potential energy and converts it into dissipated heat. While the spring's storage and release of energy has show to be useful, the shock absorber's heat dissipation has not. Actually, this obvious waste of energy is one of the many flaws associated with vehicle suspensions and has been the driving force behind several other patents.

BRIEF SUMMARY OF THE INVENTION

It is an object of the present invention to overcome the shortcomings of the traditional suspension by providing an improved damping method. Using a geared motor and an acceleration control unit instead of the usual hydraulic device, the present invention can convert the kinetic energy of the road and the energy stored in the spring into electricity. It can also assist the spring, when necessary, during adverse road conditions or fast cornering; thus, reducing the weight and size of the suspension by eliminating the need for parts with similar functions, like a stabilizer bar. Moreover, the invention uses simple parts that are easy to replace and manufacture.

The present invention is an active suspension system consisting of a geared motor connected to and driving an arm, a link, a sprocket, or a support structure that moves relative to the motor's mounting point on the vehicle's chassis. The motor being the source of the movement and the connection being the method of either rotational or translational movement. Furthermore, said connection directly influences the movement of at least one of the vehicle's wheels, producing an appropriate resistance to or an increase in the movement of that wheel. Also, the vehicle's wheel, in response to the road, transmits a force to a mounted spring, which in turn exerts a force on the vehicle's chassis. Where a centrally mounted 3-axis accelerometer and control system then powers the geared motor with a formulated response to the force. Thus, creating a closed-loop control system that not only can provide a smoother passenger ride but can also manage to convert some of the kinetic energy into electrical energy. Any additional objects, advantages, and novel features of the invention will become apparent upon examination of the following specification, or will be learned through the practice of the present invention.

BRIEF DESCRIPTION OF THE DRAWINGS

FIG. 1 is a side view of a simplified embodiment of the present invention to show basic functionality.

FIG. 2 is a front view of the simplified embodiment of the present invention.

DETAILED DESCRIPTION OF THE INVENTION

Figure 3:
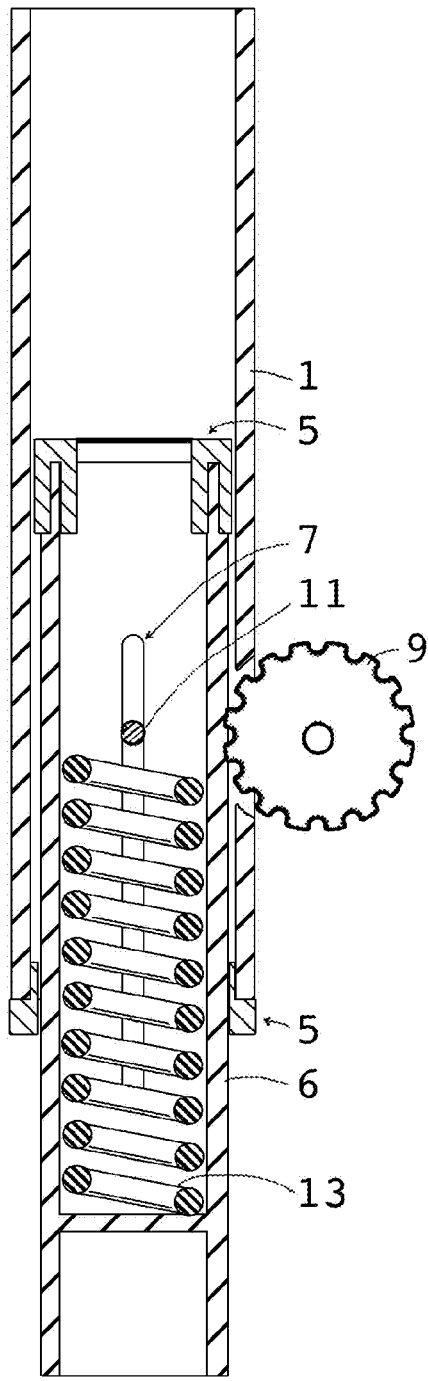
FIG. 3 is a very simplified cross-sectional side view along line I-I of FIG. 1 for the present invention.

The present invention can best be understood by associating descriptions to some of the possible applications; hence, the following description will explain the attached drawings in detail.

FIG. 1 shows a simplified embodiment of the present invention displaying a structure with the most potential for common use. The primary tube (1) would be attached to the vehicle chassis like a mounted fork or shock absorber. The secondary tube (6) would also be attached with an appropriately equivalent mounting fixture. The motor (4) and it's gearbox (3) use a special mount (2) that is bolted (8) through the primary tube (1). This keeps the motor in the proper location for its function as an active dampener, and still allows for it to be serviceable. The next thing to note is the visible flange bearing (5) and the opening (7) showing the internal spring.

FIG. 2 is the front view of FIG. 1 and shows the sprocket (9) that fits into the slot (10) that is cut into the primary tube (1) so the teeth of the sprocket can grip the holes (12) drilled into the secondary tube (6). This allows the geared motor (3 & 4) to accurately control the vertical movement of the secondary tube (6). The figure also shows the head of the mounting bolt (11), the front of the mount (2), and the flange bearing (5).

FIG. 3 shows the simplified cross-sectional view of FIG. 1 with the primary tube (1), secondary tube (6), flange bearings (5), mounting bolt (11), and the internal spring (13) all cut vertically in half. The sprocket (9) is now visibly gripping the secondary tube (6) and the mounting bolt (11) is pictured as a movable object through the opening (7) on the far side of the secondary tube (6). Ultimately, in this view one can best visualizes how the weight is reduced while the suspension's functionality is maintained.

Figure 4:
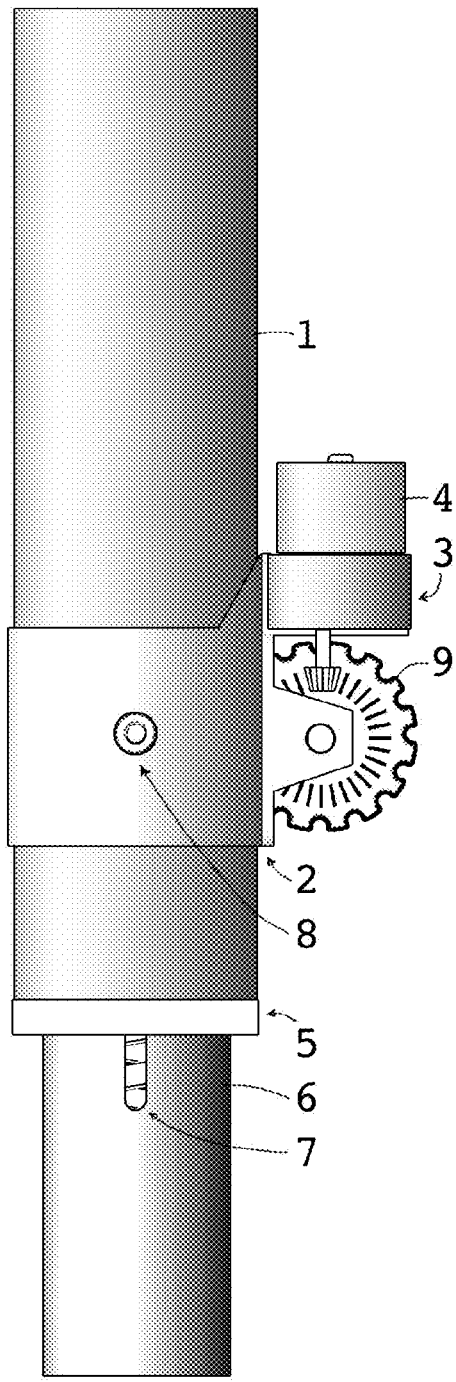
FIG. 4 is an alternative embodiment of the invention showing the motor (4) and gearbox (3) reoriented in a parallel position to the tubing (1).

FIG. 4 is an alternative embodiment view showing both the motor (4) and gearbox (3) mounted parallel to the main body, which would allow it to fit in more places while maintaining the same functionality. The biggest difference to note is that, in this design, the Sprocket (9) is also a crown gear for the gearbox (3), otherwise FIG. 4 and FIG. 1 are the same.

Figure 5:
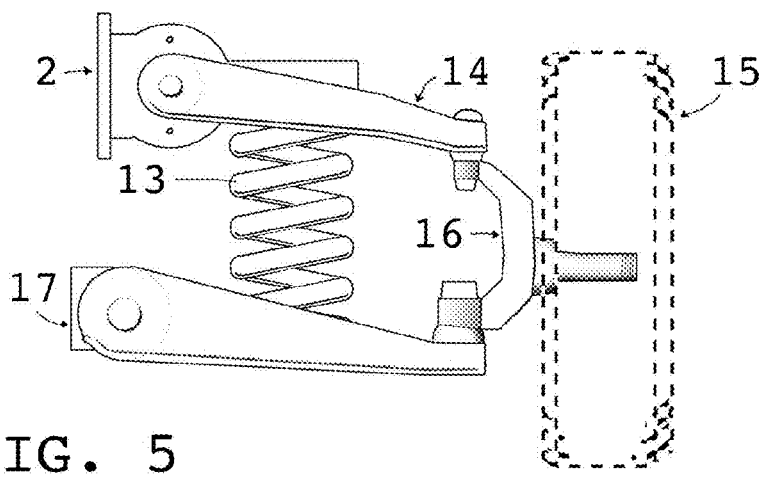
FIG. 5 is a front view of an alternative embodiment of the present invention using a double A-arm (wishbone) suspension setup.

FIG. 5 shows how an alternative embodiment would be used in a more modern vehicle suspension, like the double wishbone. In this front view you can see the motor mount (2) supports the spring (13) as well the upper A-arm (14). And, although this makes the mount (2) larger, it eliminates the use of multiple small mounts and the need to reinforce those other locations. The rest of the figure shows a simplistic knuckle (16), a tire (15), and the lower A-arm (17).

Figure 6:
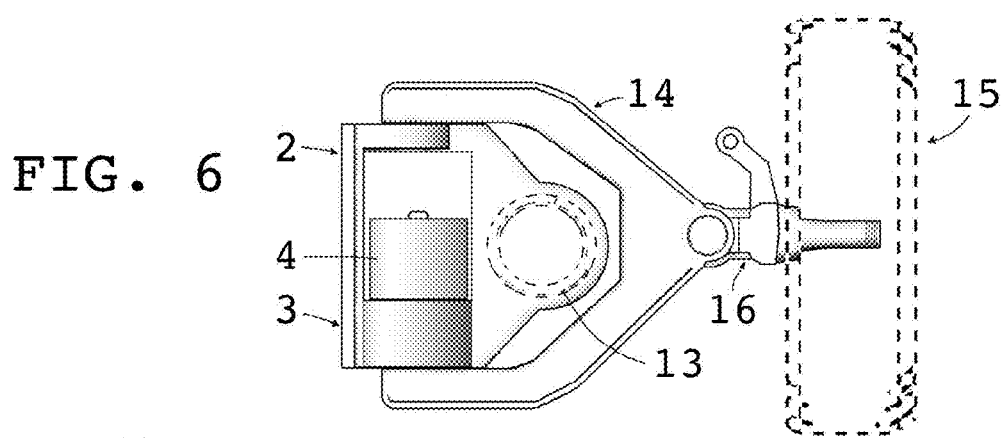
FIG. 6 is a top view of the alternative embodiment of FIG. 5 showing possible motor (4) and spring (13) mountings.

FIG. 6 is a top view of FIG. 5 with a clear view of how the motor mount (2) supports the spring (13) and the motor (4), as well as housing the gears (3) that drive the movement of the upper A-arm (14), which supports the knuckle (16) and eventually the tire (15).

Figure 7:
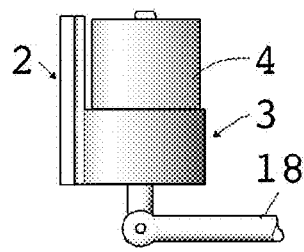
FIG. 7 is an alternative embodiment where the motor (4) and gearbox (3) are attached to a link (18) for a multi-link suspension.

FIG. 7 is an alternative embodiment that would be most appropriate for a multi-link suspension. The mounted motor (2) would simply replace one of the links mounts and the spring could go anywhere it would be found convenient. In this case the motor mount (2) would only have to be big enough to handle the forces put on that link (18), the space required for the gears (3), and the weight of the motor (4).

Figure 8:
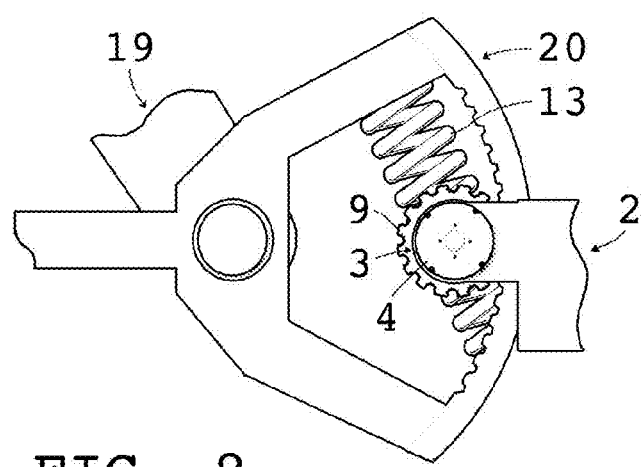
FIG. 8 shows an alternative embodiment for a swing arm suspension.

FIG. 8 is the embodiment that would be used for a swing-arm suspension. Here the swing-arm (20) is mounted to the vehicle frame (19) for its rotation, with the spring (13), being attached opposite the tire, influencing the angular movement of the swing-arm, while the frame mounted (2) sprocket (9), gearbox (3), and motor (4) actively dampen any vibration.

Figure 9:
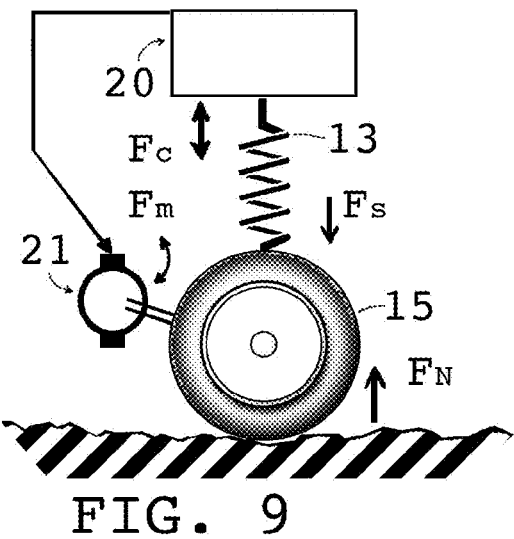
FIG. 9-12 show simplistic representations of how the suspension control system function in response to forces.

FIG. 9 is the theoretical representation of the present invention, showing the forces influencing the suspension system as it goes over regular terrain. The normal force (Fn) can be seen in this figure as the ground's influence on the tire (15), which also has a spring force (Fs) pushing downward. The spring force (Fs) in turn comes from the spring (13) that exerts force on, and is exerted on by the chassis (20) in the form of the chassis force (Fc). An accelerometer attached to the chassis (20) is used to detect this chassis force (Fc) and to formulate a response. The response is sent to the geared motor mechanical system (21) producing the geared motor force (Fm). Assuming that the normal force (Fn) is small in this figure, one can deduce that the chassis force (Fc) is also small. If a passenger is equated to an accelerometer, than a measured accelerometer value would represent the riding comfort level of the passenger. In this situation a small chassis force (Fc) would not warrant an active response from the motor (Fm), so the motor will act passively as a generator. Basically, most of the kinetic energy created from the road (Fn) and stored in the spring (13) will be converted to electrical energy, with the rest going to friction.

Figure 10:
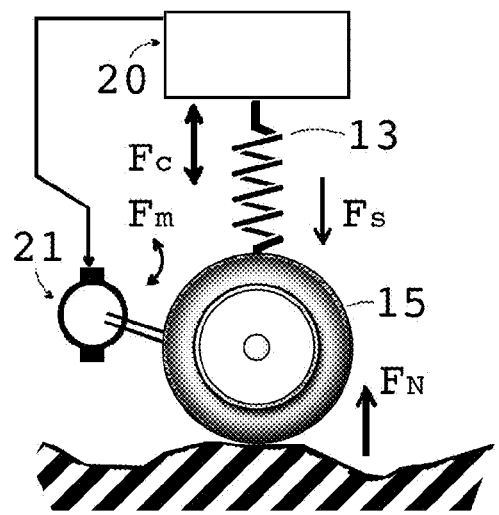

FIG. 10 represents the present invention when the terrain is extremely rough. In this case the normal force (Fn) is large, causing the chassis force (Fc) to also be large. In order to avoid bottoming out, the motor responds with a force (Fm) against the acceleration assisting the spring.

Figure 11:
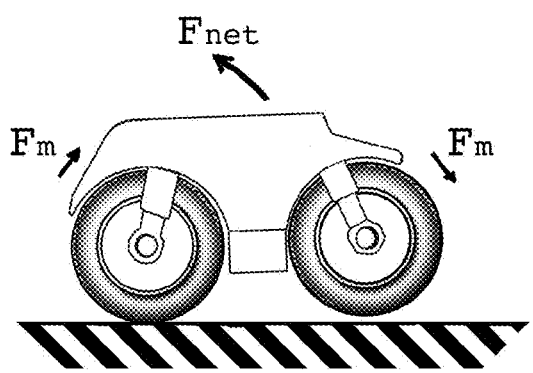

FIG. 11 shows a representation of how the suspension system would react to an excessive acceleration forward by a vehicle with at least two wheels, each wheel with it's own version of the present invention. In this situation the accelerometer would detect the net force (Fnet) as it tries to rotate the vehicle; then, the controller would send a response to the motors to counter it. The images show the rear motor force (Fm) extending the suspension, while the front motor force (Fm) tries to compress.

Figure 12:
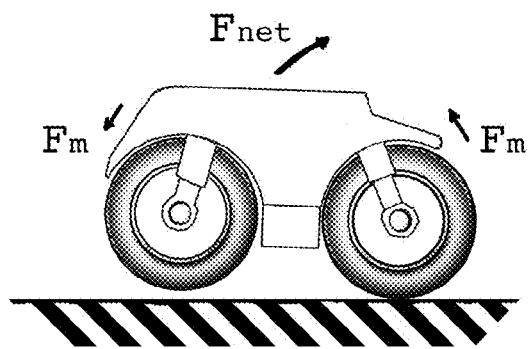

FIG. 12 is a representation of how the suspension would respond to brake dive. In this situation the net forces (Fnet) wants to make the vehicle rotate around the braking wheel, so the motors of the front and rear each apply a force (Fm) to try to oppose the rotation.

What is claimed is:

1. A vehicle suspension system wherein at least one wheel supports a vehicle frame through a spring; similarly, that one wheel is also connected to the vehicle frame through a geared motor by way of a lever, pulley, or wheel and axle mechanism; furthermore, the geared motor is powered by a programmed control unit, and the programmed control unit responds to acceleration changes; consequently, the geared motor actively participates in at least one of suspending the vehicle, suppressing vehicular oscillation, or generating electric power.

* * * * *